July 28, 1925.

W. E. COLLINS 1,547,164

COTTON GIN

Original Filed July 19, 1921    2 Sheets—Sheet 1

INVENTOR.
William E. Collins

BY
Hardway Cather
ATTORNEYS

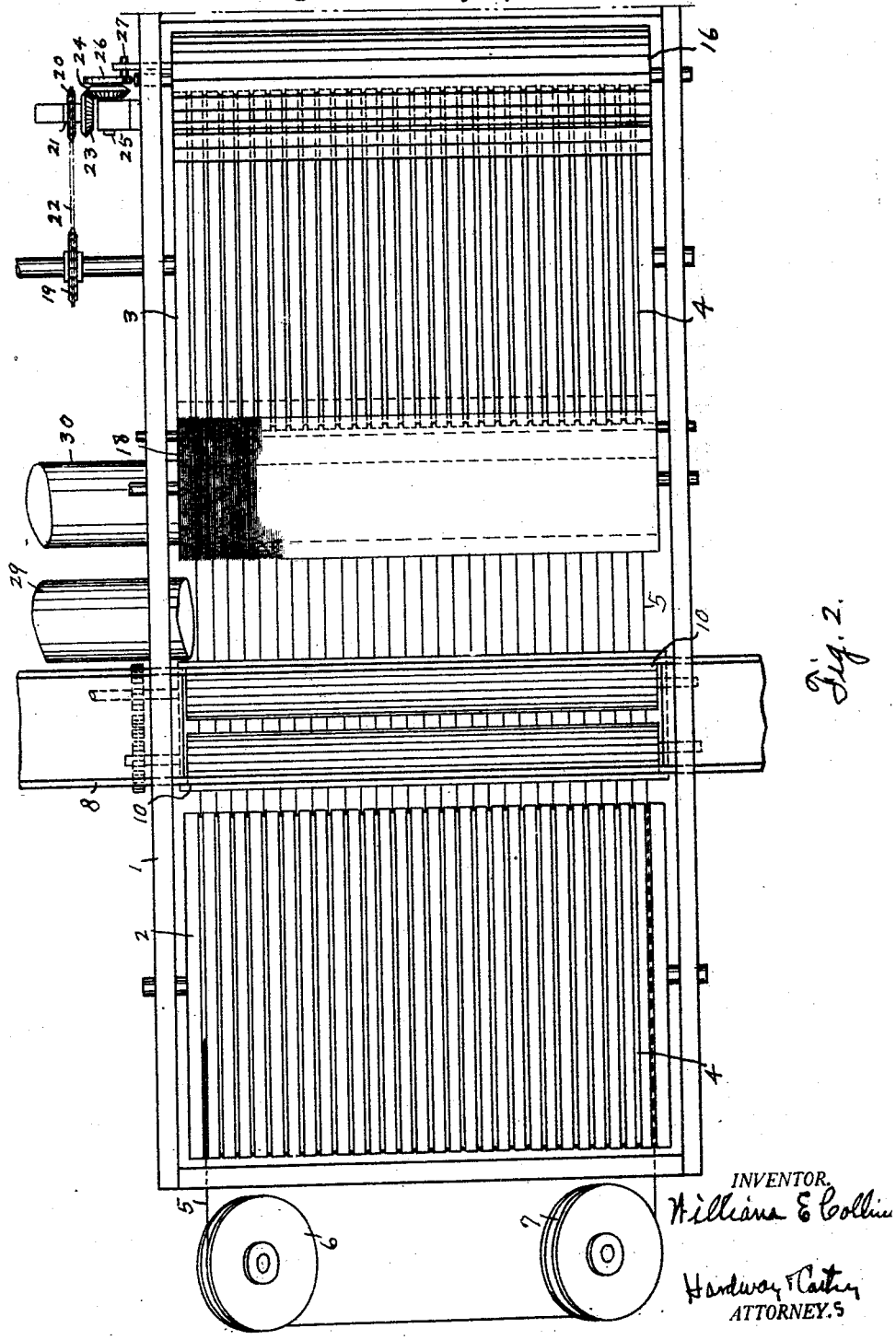

Patented July 28, 1925.

1,547,164

UNITED STATES PATENT OFFICE.

WILLIAM E. COLLINS, OF HOUSTON, TEXAS; R. T. COLLINS ADMINISTRATOR OF SAID WILLIAM E. COLLINS, DECEASED.

COTTON GIN.

Application filed July 19, 1921, Serial No. 485,918. Renewed June 1, 1925.

*To all whom it may concern:*

Be it known that I, WILLIAM E. COLLINS, a citizen of the United States, residing at Houston, in the county of Harris and State of Texas, have invented certain new and useful Improvements in a Cotton Gin, of which the following is a specification.

This invention relates to new and useful improvements in a cotton gin.

One object of the invention is to provide a cotton gin whereby the seed may be stripped from the lint without injuring the staple.

Another object is to provide a gin which will relieve the seed of all the lint and discharge the seed with practically no lint adhering thereto.

A further object resides in the provision of a gin equipped with means for separating the motes from the lint and discharging them separately from the gin.

With the above and other objects in view this invention has particular relation to certain novel features of construction, operation and arrangement of parts, an example of which is given in this specification and illustrated in the accompanying drawings, wherein:—

Figure 2 is a plan view.

Figure 1:
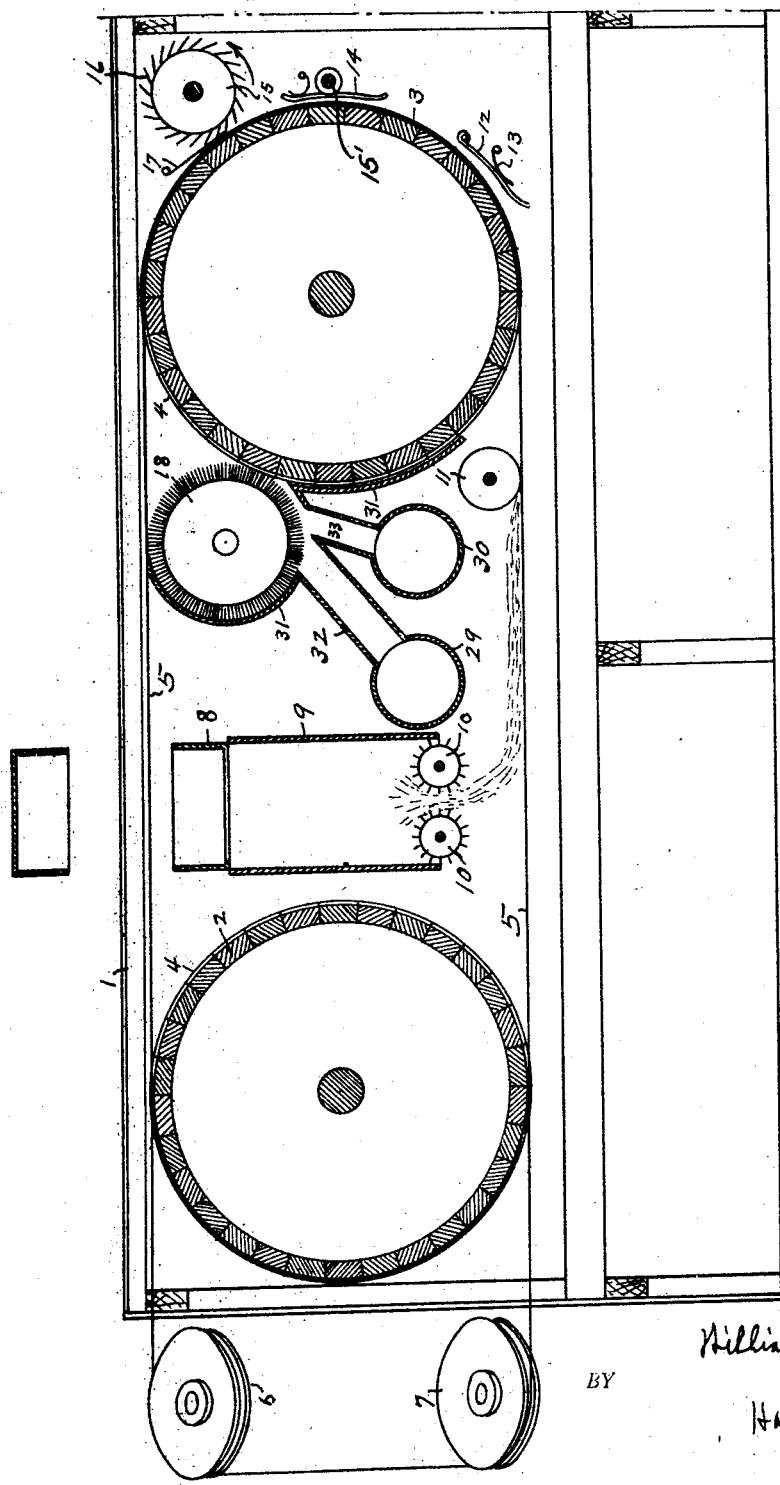
Figure 1 is a vertical sectional view of the gin.

Referring now more particularly to the drawings, the numeral 1 designates a framework. Rotatably mounted in opposite ends of the framework are comparatively large drums 2 and 3, each of which has a deep closely spiralled groove 4 therearound. An endless wire 5, works in said grooves, said wire traveling over the grooved end pulleys 6 and 7, mounted opposite the drum 2 as shown. As the wire is fed off of one end of the drum 2 it passes first over the pulley 6, which is disposed to receive it, and passes thence over the pulley 7, which is so disposed as to feed the wire back onto said drum 2 at its other end. From the drum 2 the wire passes around the drum 3 following the spiralled grooves of said drums and thus moving continuously transversely from the feed ends to the discharge ends of the drums. The turns of the wire are thus spaced apart, as shown in Figure 2, forming a traveling apron onto which the seed cotton is fed, as hereinafter explained.

A distributer 8, of any well known construction, is arranged transversely between the drums and by it the seed cotton is delivered, through a hopper 9, to the feed rollers 10, 10 which are rotatably mounted at the discharge end of the hopper and between which the cotton passes and by which it is formed into a bat which is delivered onto said apron as shown in Figure 2. The bat passes under the compression roller 11, arranged above the belt behind the drum 3, and passes thence around said drum. The pressure of the roller 11 will tend to force the seed through between the wires of the apron and toward the outside of the bat. Arranged adjacent the underside of the drum 3 there is a friction plate 12 which is pivoted at one edge and whose free edge is outwardly curved. This plate extends across the full length of the drum and the bat passes under the free edge thereof and between it and the drum. This plate is held yieldingly against the bat by a spring 13 and the friction thereof against the bat tends to separate and loosen the seed from the lint. The cotton passes on with the drum and passes next under a reciprocating friction hood 14 which is slidably mounted on a transverse rod 15' arranged adjacent said drum. This hood is held yieldingly against the cotton and reciprocated through a mechanism hereinafter described and has the effect of further loosening and separating the seed from the lint.

Above the hood 14 there is a transverse cylindrical beater 15 whose periphery carries the fabric strips or beaters 16 whose outer edges are free. This beater roller rotates in the direction indicated by the arrow in Figure 1 and it is located near the drum 3 so that the beater will be carried out by centrifugal force and will strike against the seed and knock them from the lint. The seed are retarded, at this point, by a transverse stripper bar 17 arranged tangential with respect to the drum and located between it and the beater 15. This retardation of the seed gives the beaters time to separate all of them from the lint. The lint is pulled on around by the apron between the drum and stripper bar and is swept off of the drum by means of a rotating cylindrical brush 18 which operates in co-operation with said brush.

Fixed on the driving shaft of the drum 3 there is a sprocket wheel 19 in alignment with a corresponding sprocket wheel 20 fixed on the short shaft 21, and the latter is driven from the former through a sprocket chain 22. The shaft 21 has a pinion 23 which is in mesh with and drives a pinion 24 fixed on the shaft 25. This shaft also has a disc 26 fixed thereon, which carries an eccentric pin 27 and a connecting rod 28 has a bearing at one end through which said pin works and the other end of this connecting rod is connected to and reciprocates the hood 14.

There is a transverse lint flue 29 mounted in the framework underneath the brush 18 and between it and the drum 3 there is a transverse mote box 30. An arcuate hood 31 partially surrounds the brush and drum 11 and leading from it to the lint flue and mote box are the respective chutes 32 and 33, through which the lint is delivered to the lint flue, and the motes are discharged into the mote box. Air suction through the lint flue carries away the lint to the condenser, and the motes and other heavy particles which are discharged by the centrifugal force of the brush 18 into the mote box may be disposed of in any manner desired.

It is to be understood that any number of gins desired may be arranged side by side, and operated from a common power shaft and the distributer and lint flue may be extended to accommodate all of them.

What I claim is:—

1. A cotton gin, including a framework, a pair of rotatable drums spaced apart therein, an endless apron operating over said drums and formed with slits, a distributer arranged to deliver cotton onto said apron between the drums, a stripper bar arranged to co-operate with one drum, a friction roller arranged to co-operate with said bar and drum, a cylindrical brush arranged to co-operate with said last mentioned drum, and a lint flue into which the lint is delivered by said brush.

2. A cotton gin, including a framework, a pair of drums spaced apart therein, an endless cotton conveyor operating over the drums and formed with slits, a distributer arranged to deliver said cotton onto said conveyor between the drums, a friction member co-operating with one drum and between which said drum and the conveyor and cotton carried thereby pass, a friction roller arranged to co-operate with said drum and conveyor to free the seed from the lint, a lint flue, and means provided to deliver the lint into said flue.

3. A cotton gin, including a framework, a pair of drums spaced apart therein, an endless cotton conveyor operating over the drums and formed with slits, a distributer arranged to deliver said cotton onto said conveyor between the drums, a friction member co-operating with one drum and between which said drum and the conveyor and cotton carried thereby pass, a friction roller arranged to co-operate with said drum and conveyor to free the seed from the lint, a stripper bar co-operating with the drum and provided to arrest the seed while being operated upon by said friction roller, a lint flue, and means provided to deliver the lint into said flue.

4. A cotton gin, including a framework, a pair of drums spaced apart therein, an endless cotton conveyor operating over the drums and formed with slits, a distributer arranged to deliver said cotton onto said conveyor between the drums, a friction member co-operating with one drum and between which said drum and the conveyor and cotton carried thereby pass, a friction roller, friction members carried by said roller and arranged to co-operate with said drum and conveyor to free the seed from the lint, a lint flue, and means provided to deliver the lint into said flue.

5. A cotton gin, including a framework, a pair of rotatable drums spaced apart therein, an endless apron operating over said drums and formed with slits, means arranged to deliver cotton onto said apron between the drums, a stripper bar arranged to co-operate with one drum, a friction roller arranged to co-operate with said bar and drum, a cylindrical brush arranged to co-operate with said last mentioned drum, and a lint flue into which the lint is delivered by said brush.

6. A cotton gin, including a framework, a pair of drums spaced apart and rotatably mounted in the framework and provided with spiralled grooves, an endless cable operating over the drums in said grooves, and whose turns are spaced apart, forming an endless conveyor, means for delivering seed cotton onto said conveyor between the drums, a lint flue, a mote box, a friction roller co-operating with one of said drums, a stripper bar located between said roller and drum and provided to arrest the seed, said roller operating to free the arrested seed from the lint and said conveyor operating to carry the cotton around the drum past said bar, and means arranged behind the bar and provided to release the lint from said drum and deliver the lint and motes into said flue and box, respectively.

7. A cotton gin, including a framework, a pair of drums spaced apart and rotatably mounted in the framework and provided with spiralled grooves, an endless cable operating over the drums in said grooves, and whose turns are spaced apart, forming an endless conveyor, means for delivering seed cotton onto said conveyor between the drums, a lint flue, a mote box, a friction roller co-operating with one of said drums, a reciprocating friction member co-operating with said drum in front of said roller, a stripper bar located between said roller and drum and provided to arrest the seed, said roller operating to free the arrested seed from the lint and said conveyor operating to carry the cotton around the drum past said bar, and means arranged behind the bar and provided to release the lint from said drum and deliver the lint and motes into said flue and box, respectively.

In testimony whereof I have signed my name to this specification in the presence of two subscribing witnesses.

WILLIAM E. COLLINS.

Witnesses:
   E. V. Hardway,
   Jas. W. Oliver.